US010594118B1

(12) United States Patent
Abadi et al.

(10) Patent No.: US 10,594,118 B1
(45) Date of Patent: Mar. 17, 2020

(54) CABLE ROUTING SYSTEM FOR ELECTRIFIED GLASS

(71) Applicant: INNOVATIVE GLASS CORPORATION, Plainview, NY (US)

(72) Inventors: Steve Abadi, Jericho, NY (US); Kenneth Pesonen, Holtsville, NY (US); Kenneth J. Casser, Port Washington, NY (US)

(73) Assignee: INNOVATIVE GLASS CORPORATION, Plainview, NY (US)

( * ) Notice: Subject to any disclaimer, the term of this patent is extended or adjusted under 35 U.S.C. 154(b) by 300 days.

(21) Appl. No.: 15/453,175

(22) Filed: Mar. 8, 2017

Related U.S. Application Data

(60) Provisional application No. 62/389,810, filed on Mar. 9, 2016.

(51) Int. Cl.
| | | |
|---|---|---|
| *H02G 3/00* | (2006.01) | |
| *H02G 3/04* | (2006.01) | |
| *H02G 1/06* | (2006.01) | |
| *H01B 7/08* | (2006.01) | |
| *E06B 7/28* | (2006.01) | |

(52) U.S. Cl.
CPC ............. *H02G 3/0456* (2013.01); *E06B 7/28* (2013.01); *H01B 7/08* (2013.01); *H02G 1/06* (2013.01); *H02G 3/0437* (2013.01)

(58) Field of Classification Search
CPC ...... H02G 3/0456; H02G 1/06; H02G 3/0437; H02G 3/04; H02G 3/0431; H02G 3/00; E06B 7/28; H01B 7/08
USPC ........... 174/97, 68.1, 68.3, 72 R, 72 C, 88 R
See application file for complete search history.

(56) References Cited

U.S. PATENT DOCUMENTS

| 7,042,738 B2 * | 5/2006 | Tsubaki | B60R 16/0215 |
| | | | 174/72 A |
| 7,683,259 B2 * | 3/2010 | Tsubaki | H02G 11/00 |
| | | | 174/135 |
| 7,829,789 B2 * | 11/2010 | Yamaguchi | B60N 2/0224 |
| | | | 174/68.1 |
| 9,219,359 B2 * | 12/2015 | Sekino | H01B 7/0045 |
| 9,308,833 B2 * | 4/2016 | Sekino | B60N 2/0705 |
| 10,315,593 B2 * | 6/2019 | Nishi | B60R 16/0215 |
| 2013/0157493 A1 * | 6/2013 | Brown | H01R 41/00 |
| | | | 439/247 |
| 2016/0344148 A1 | 11/2016 | Mullins et al. | |

* cited by examiner

*Primary Examiner* — Angel R Estrada
(74) *Attorney, Agent, or Firm* — Carter, Deluca & Farrell LLP; Francesco Sardone, Esq.

(57) ABSTRACT

A self-contained cable routing system for powering an energy receiving device associated with a movable member includes a track, a slider, and a cable. The slider is at least partially disposed within a channel of the track and slidably coupled to the track. The cable extends through the channel of the track and includes a first end portion fixed adjacent a first end portion of the track and is configured to be electrically coupled to a power source. A second end portion of the cable is fixed to the slider.

13 Claims, 10 Drawing Sheets

CABLE ROUTING SYSTEM FOR ELECTRIFIED GLASS

CROSS-REFERENCE TO RELATED APPLICATION

This application claims the benefit of and priority to U.S. Provisional Application Ser. No. 62/389,810, filed on Mar. 9, 2016, the entire content of which is hereby incorporated by reference herein.

BACKGROUND

Smart glass or electrified glass is a switchable glazing capable of altering its degree of opacity in response to the selective application of energy. Typically, the opacity of the smart glass is adjusted using one of a variety of technologies, such as, for example, suspended particle devices, electrochromic devices, polymer dispersed liquid crystal devices, micro-blinds, or nanocrystals.

Each of the smart glass technologies requires an application of electricity to effect a state change. For example, with a smart glass incorporating liquid crystal technology, when a voltage is applied to the smart glass, the liquid crystals are caused to align to allow light to pass therethrough giving the smart glass a transparent appearance (e.g., the glass is see-through). When no voltage is applied to the smart glass, the liquid crystals are arranged in a random order, which results in a scattering of light as it passes therethrough giving the smart glass a translucent appearance (e.g., the glass is opaque).

In some applications, smart glass may be incorporated into a moving component such as a sliding door, window, or the like. Currently there are challenges in maintaining the electrical continuity between a moving pane of smart glass and a power source. Accordingly, a need exists for an elegant and easy to install cable routing system that maintains electrical continuity to a pane of smart glass even while the smart glass is moving relative to its power source.

SUMMARY

In accordance with an aspect of the present disclosure, a self-contained cable routing system for powering an energy receiving device associated with a movable member is provided. The cable routing system includes a track defining a channel therethrough, a slider configured to be at least partially disposed within the channel of the track and slidably coupled to the track, and a cable configured to extend through the channel of the track. A first end portion of the cable is configured to be fixed adjacent a first end portion of the track and to be electrically coupled to a power source. A second end portion of the cable is configured to be fixed to the slider.

In some embodiments, the cable routing system may further include a biasing assembly having a biasing member. The biasing member may have a first end portion fixed relative to the track and a second end portion configured to be associated with the cable such that the biasing member maintains a tension on the cable as the slider moves along the track with the second end portion of the cable.

In some embodiments, the cable may include an intermediate portion interconnecting the first and second end portions of the cable. The second end portion of the cable may be folded over the intermediate portion of the cable.

It is contemplated that the intermediate portion of the cable may have a dynamically folded portion. The second end portion of the biasing member may be associated with the dynamically folded portion of the intermediate portion of the cable. The biasing assembly may include an axle coupled to the second end portion of the biasing member. The dynamically folded portion of the intermediate portion of the cable may be wrapped about the axle. The axle may be configured to support a movement of the cable along a circumference of the axle as the slider moves along the track. The biasing assembly may further include a connector having a first end coupled to the second end portion of the biasing member and a second end looped through both the axle and the dynamically folded portion of the intermediate portion of the cable to couple the cable to the biasing member.

It is envisioned that a length of the cable that extends through an upper portion of the track may increase as the slider moves away from the biasing member.

It is contemplated that the second end portion of the biasing member may be configured to extend relative to the first end portion thereof in response to a movement of the slider away from the biasing member.

It is envisioned that the first end portion of the biasing member may be fixed to the second end portion of the track.

In some embodiments, the slider may include a block portion disposed within the channel of the track, and an arm attached to the block portion and disposed outside of the channel of the track. The block portion may define a cavity for receipt of the second end portion of the cable. The arm may define a bore therethrough in communication with the cavity such that the send end portion of the cable extends from the cavity of the block portion through the bore of the arm. The cable may be a ribbon cable and the second end portion of the ribbon cable may include a wire connector captured in the cavity of the block portion of the slider, and a wire coupled to the wire connector. The wire may extend through the bore of the arm of the slider and project out of an opening defined in the arm of the slider.

In another aspect of the present disclosure, a method of installing a cable routing system is provided. The method includes fixing a track to a support structure or a movable member having an energy receiving device. A first end portion of a cable is electrically coupled to a power source. The cable extends through a channel defined through the track and includes a second end portion fixed to a slider that is at least partially disposed within the channel of the track and slidably coupled to the track. The second end portion of the cable is electrically coupled to the energy receiving device.

In some embodiments, the cable may be associated with a biasing member of a biasing assembly that is fixed at an end portion thereof to the track such that the biasing member maintains a tension on the cable as the slider moves along the track.

Some methods may further include folding a second end portion of the cable over an intermediate portion of the cable, and coupling a dynamically folded portion of the intermediate portion of the cable to the biasing member. Coupling the dynamically folded portion of the intermediate portion of the cable to the biasing member may include wrapping the dynamically folded portion of the intermediate portion of the cable about an axle of the biasing assembly that is coupled to the biasing member. The axle may be configured to support a movement of the cable along a circumference of the axle as the slider moves along the track.

Some methods may further include positioning a block portion of the slider in the channel of the track. The slider may include an arm attached to the block portion and disposed outside of the channel of the track. A wire connector of the second end portion of the cable may be captured in a cavity defined in the block portion of the slider. A wire extending from the wire connector may be threaded through a bore defined through the arm of the slider such that the second end portion of the cable extends from the cavity of the block portion through the bore of the arm and out of an opening defined in the arm of the slider.

In yet another aspect of the present disclosure, a cable routing system for powering electrified glass associated with a slidable member is provided. The cable routing system includes a track defining a channel therethrough, a slider, a ribbon cable extending through the channel of the track, and a biasing assembly. The slider includes a block portion at least partially disposed within the channel of the track and slidably coupled to the track, and an arm attached to the block portion and disposed outside of the channel of the track. The ribbon cable includes a first end portion fixed to a first end portion of the track and configured to be electrically connected to a power source. A second end portion of the ribbon cable is fixed to the slider and extends from a cavity defined in the block portion through a bore defined through the arm and out of an opening defined in the arm. The biasing assembly includes a biasing member having a first end portion fixed to a second end portion of the track and a second end portion associated with a dynamically folded intermediate portion of the cable such that the biasing member maintains a tension on the cable as the slider moves along the track with the second end portion of the cable.

Further details and aspects of exemplary embodiments of the present disclosure are described in more detail below with reference to the appended figures.

As used herein, the terms parallel and perpendicular are understood to include relative configurations that are substantially parallel and substantially perpendicular up to about + or −10 degrees from true parallel and true perpendicular.

BRIEF DESCRIPTION OF THE DRAWINGS

Embodiments of the present disclosure are described herein with reference to the accompanying drawings, wherein.

DETAILED DESCRIPTION

Figure 1:
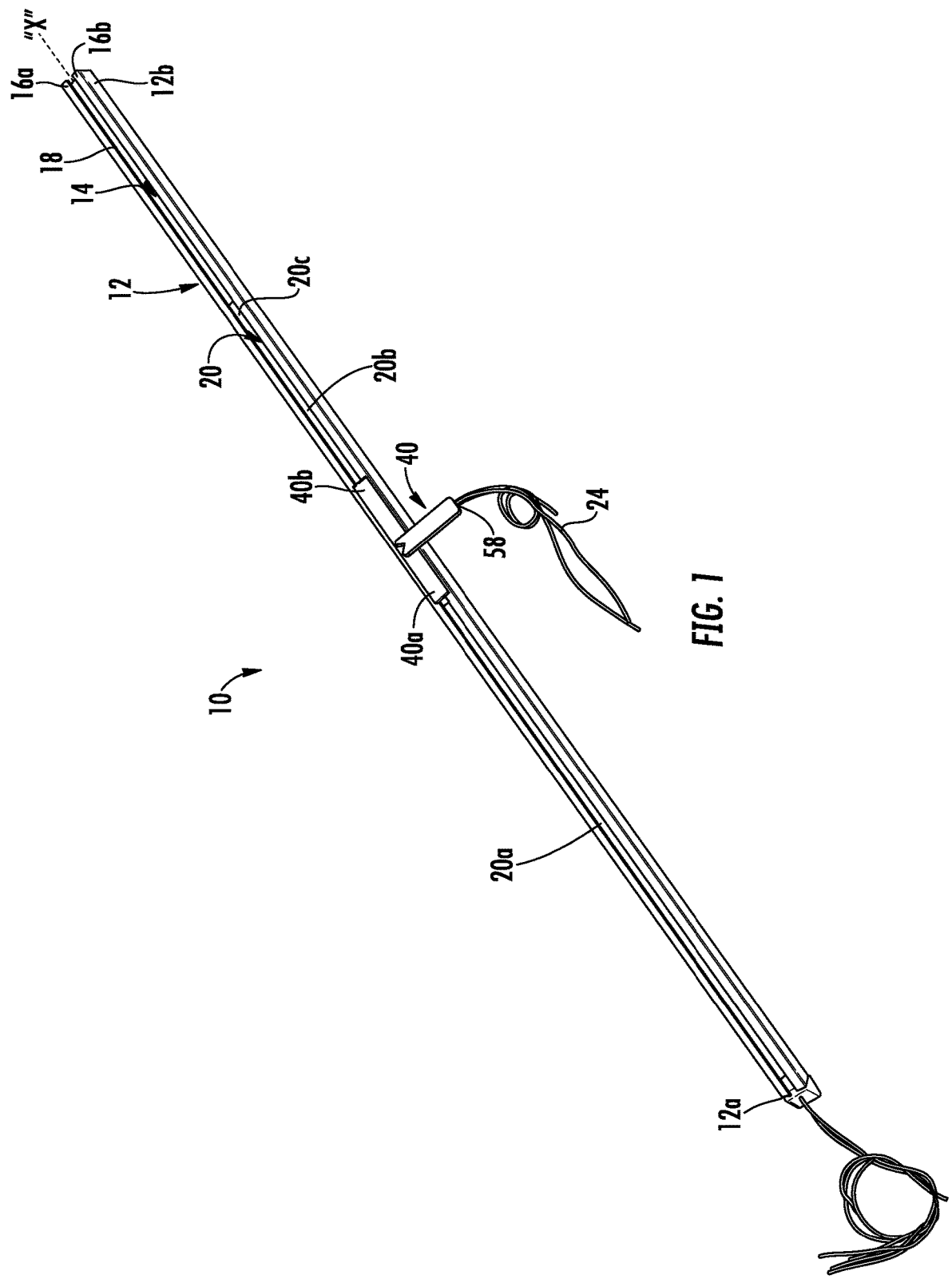
FIG. 1 is a perspective view of a cable routing system for use with electrified glass in accordance with the present disclosure.

Embodiments of the presently disclosed cable routing system is described in detail with reference to the drawings, in which like reference numerals designate identical or corresponding elements in each of the several views.

The present disclosure provides a self-contained cable routing system for use with an energy receiving device including electrified glass (e.g., switchable glazing) that is secured to a movable member, such as, for example, sliding doors, sliding windows, machines, lift up doors, sliding skylights, garage doors, barn doors, automotive windows or sunroofs, powered medical equipment, etc. The cable routing system includes a track and a slider movably coupled to the track. The slider carries an end of a cable that supplies electricity to the energy receiving device (e.g., electrified glass). A biasing member may be provided in the system which provides a constant tension on the cable during a traversal of the slider along the track to prevent the cable from bunching, crimping, or tangling. The system allows for the continuous supply of electricity to the electrified glass throughout a movement (e.g., sliding) of the electrified glass relative to its power source.

The slider may be a slideblock designed to smoothly slide in a slot in a tube and protect the wire from exposure or abrasion or entanglement throughout its range of travel. The slideblock has a cavity to house a connector assembly to transition a flat ribbon wire to a conventional wire. The slideblock and the tube may be manufactured from plastic, metal, wood, or any other suitable material. The ribbon wire may include single or multiple conductors of any gauge to carry logic signals, audio signals, low voltage or high voltage power to the peripheral device on the moving object. In embodiments, the cable routing system may be adapted to provide movable energy in the form of pneumatics, fluid, air, gas, and fiber optics. In some embodiments, the cable routing system may be moisture and water resistant. In some embodiments, the cable routing system may be adapted to provide an infinitely positional power outlet and/or an infinitely positional light source. In some embodiments, the power track may be produced to enable a virtually unlimited range of travel and motion.

Referring initially to FIG. 1, a self-contained cable routing system 10 is illustrated and generally includes a track 12, a cable 20, a slider 40, and a biasing member assembly 70 (FIGS. 5-7B). The track 12 has a first end portion 12a and a second end portion 12b and defines a longitudinal axis "X" therebetween. The track 12 defines a longitudinally-extending channel 14 therethrough configured for receipt of the cable 20. While the track 12 is illustrated as being linear, other configurations of the track 12 are contemplated, such as curvilinear, angled, tortuous, or the like. The track 12 includes a pair of rails or walls 16a, 16b extending longitudinally along the track 12 length. The rails 16a, 16b are laterally spaced from one another to define a gap 18 therebetween that permits the passage of the slider 40 along the track 12 length.

The cable 20 of cable routing system 10 may be a flexible ribbon cable having one or more parallel running wires disposed in the same plane to carry logic signals, audio signals, low voltage power, or high voltage power. In some embodiments, the cable 20 may be any suitable cable, such as, for example, a single wire or a conventional cable made of multiple strands of wire. The cable 20 is dimensioned for receipt in the channel 14 of the track 12 and may have a width substantially equal to a width of the 14 channel of the track 12. In other embodiments, the cable 20 may be configured as a constant-force spring coiled about or into a spool disposed at the second end portion 12b of the track 12.

Figure 2:
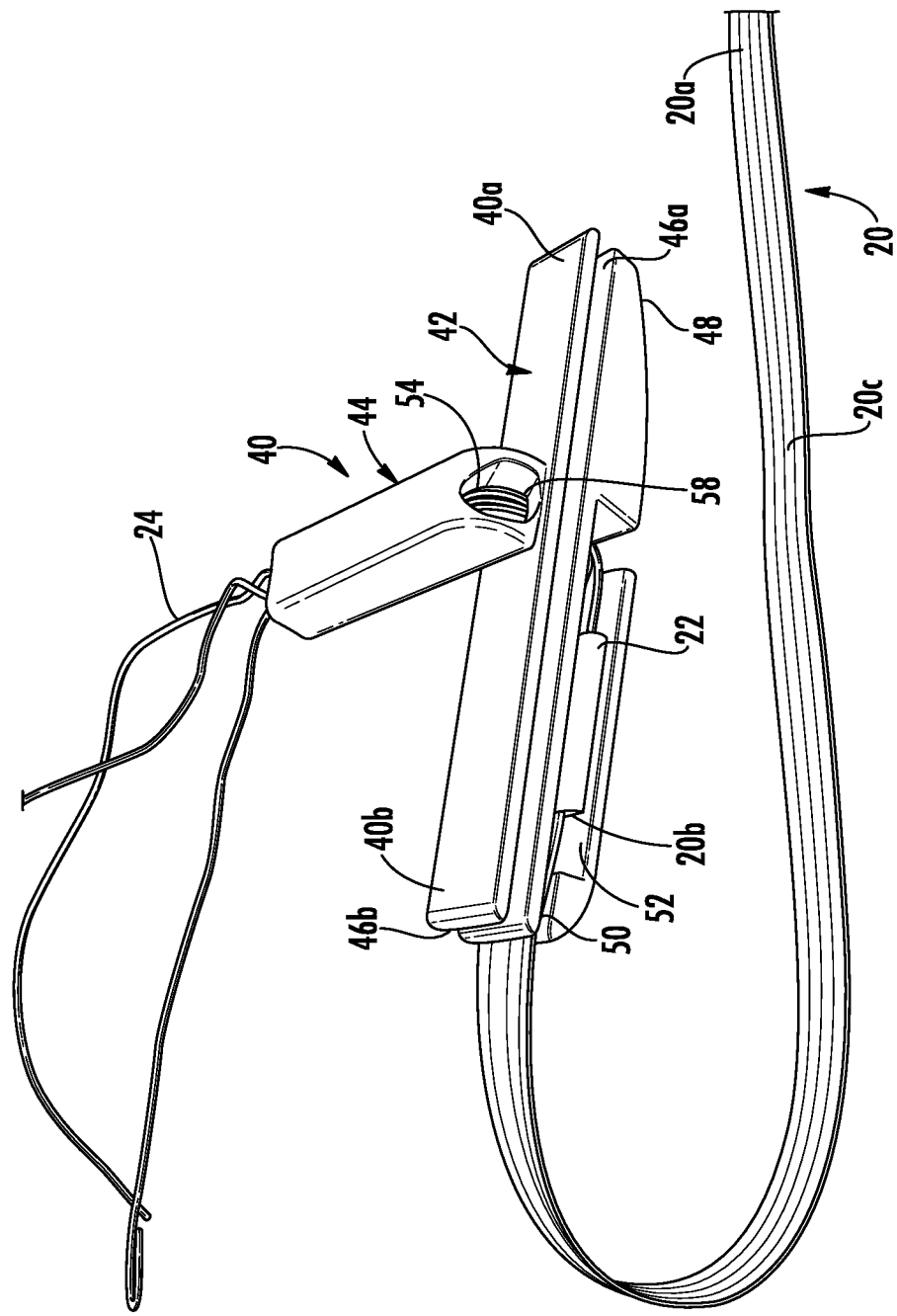
FIG. 2 is a perspective view of a cable of the cable routing system of FIG. 1 coupled to a slider of the cable routing system of FIG. 1.
Figure 3:
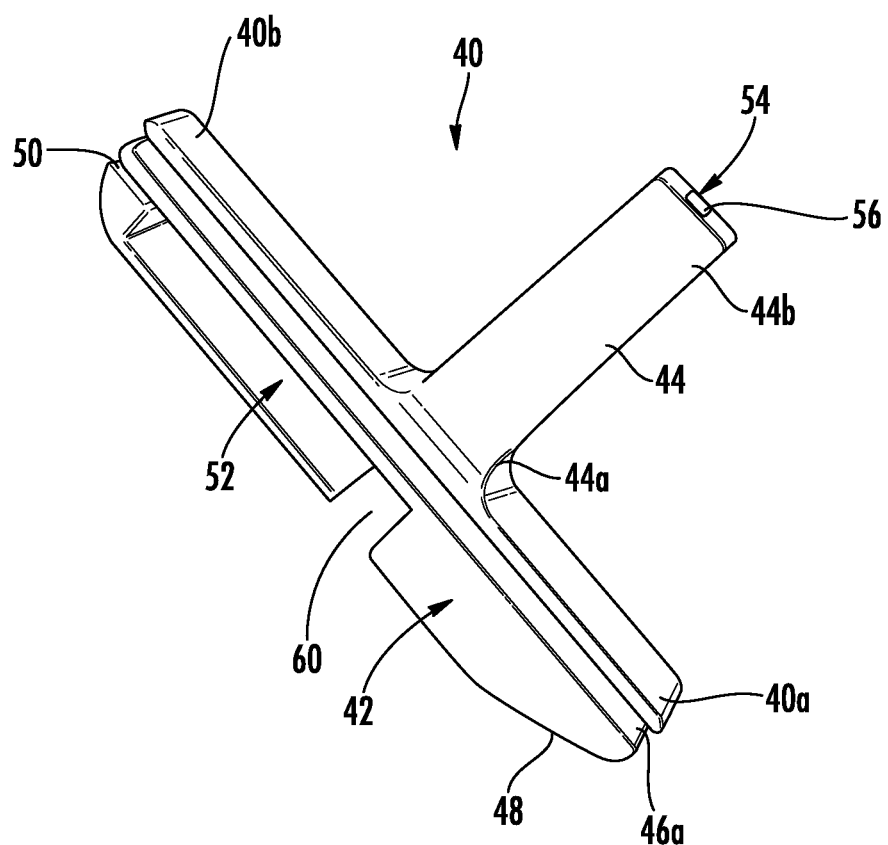
FIG. 3 is a side view of the slider of FIG. 2.
Figure 4:
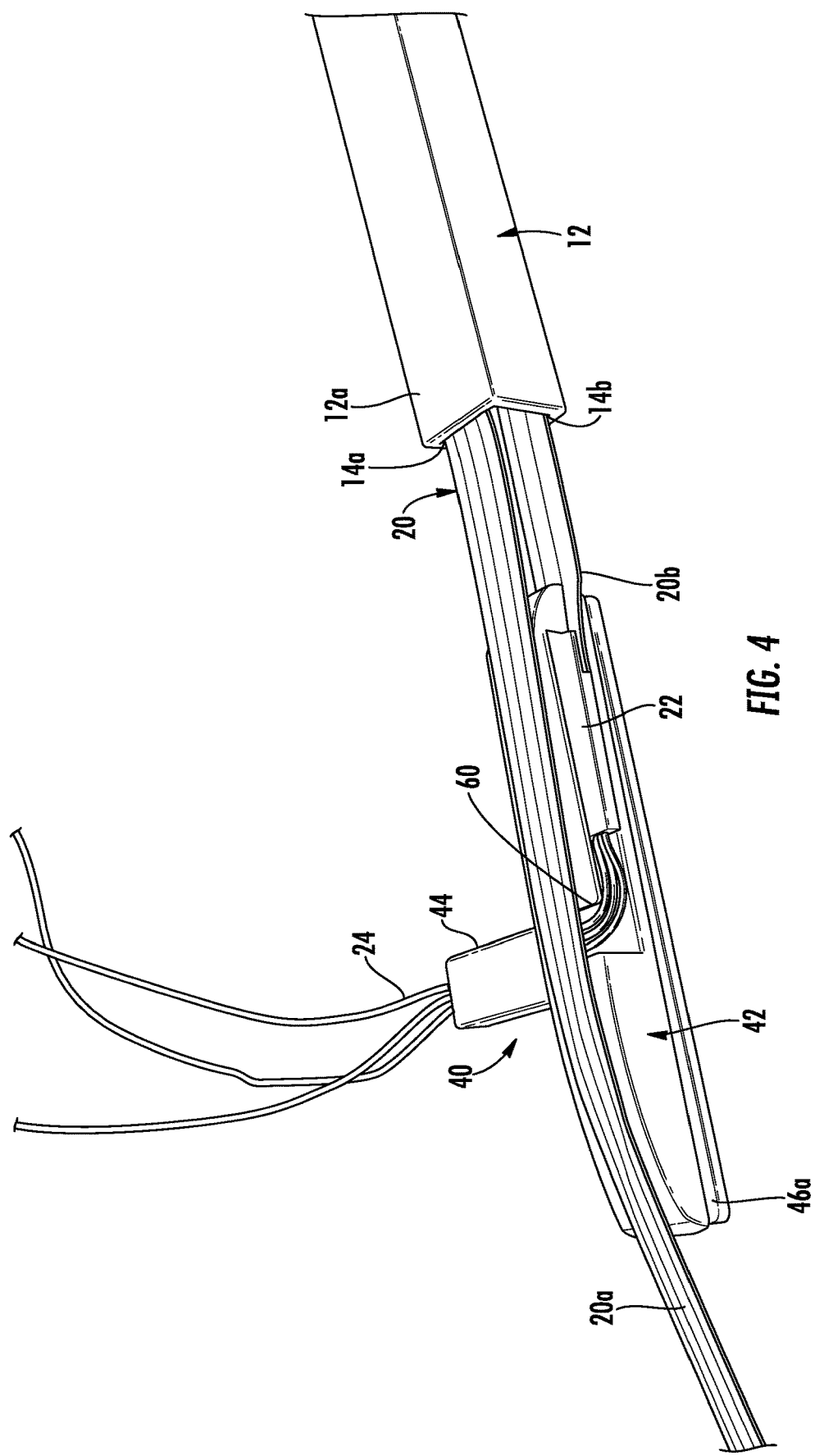
FIG. 4 is a perspective view of the slider and the cable of the cable routing system inserted into a track of the cable routing system.
Figure 5:
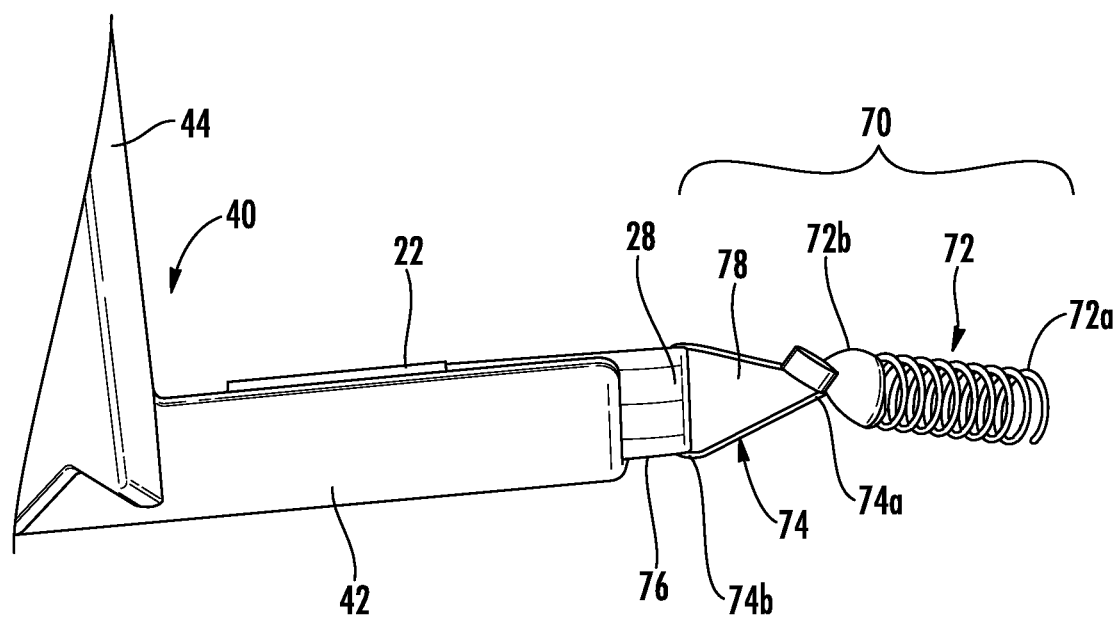
FIG. 5 is a top view of the slider, the cable, and a biasing assembly of the cable routing system of FIG. 1.
Figure 6:
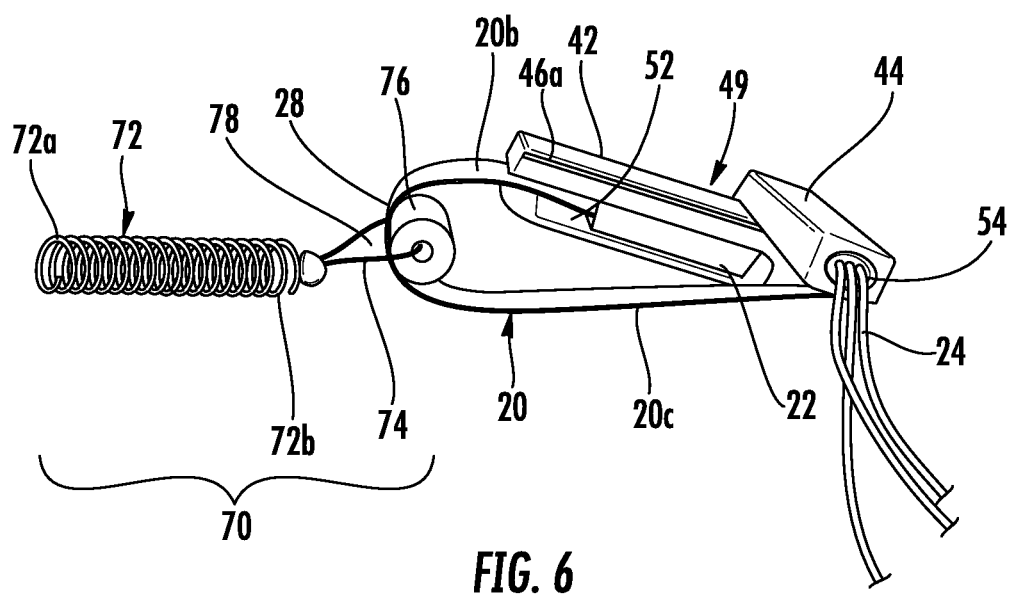
FIG. 6 is a side view of the slider, the cable, and the biasing assembly of the cable routing system of FIG. 1.

With reference to FIGS. 1 and 2, the cable 20 has a first end portion 20a, a second end portion 20b, and an intermediate portion 20c interconnecting and extending between the first and second end portions 20a, 20b. The first end portion 20a of the cable 20 is fixedly connected to the first end portion 12a of the track 12 and is configured to be electrically coupled to a power source (e.g., a wall-mounted outlet, electrical panel, etc.). The first end portion 20a of the cable 20 may be detachable or extendable from the first end portion 12a of the track 12. The second end portion 20b of the cable 20 is configured to be fixedly attached to the slider 40. The second end portion 20b of the cable 20 includes a wire connector 22 such as an IDC connector that converts the second end portion 20b of the flat ribbon cable 20 into more or more conventional wires 24. Each wire 24 of the second end portion 20b of the cable 20 is configured to be electrically connected to an energy receiving device such as a pane of electrified glass to provide power to the glass. In some embodiments, the second end portion 20b of the cable 20 may be devoid of the wire connector 22 and/or the wire 24.

With reference to FIGS. 1-4, the slider 40 of the cable routing system 10 is slidably coupled to the track 12 such that the slider 40 is movable to selected positions along the track 12 while remaining fixed to the track 12 or secured within track 12. The slider 40 may be fabricated from PVC or any suitable material. It is contemplated that the slider 40 may be constructed from a material having a degree of lubricity made for slider 40 to translate more freely (e.g., with less friction) through track 12.

The slider 40 includes a block portion or main body 42 and an arm 44 extending from the block portion 42. The block portion 42 is partially disposed within the channel 14 of the track 12 and includes a pair of linear slots 46a, 46b defined along opposing lateral sides of the block portion 42. The slots 46a, 46b receive the rails 16a, 16b of the track 12 to prevent the slider 40 from being dislodged from the track 12 and allowing the slider 40 to slide along the track 12.

The block portion 42 of the slider 40 has a leading end 40a and a trailing end 40b. The leading end 40a has a tapered surface 48 configured to plow (e.g., slide over) any crimps that may develop in the cable 20 during use. The trailing end 40b of the block portion 42 defines a planar slit 50 therein dimensioned for passage of the second end portion 20b of the ribbon cable 20. The block portion 42 further defines an internal cavity 52 in communication with the slit 50 of the trailing end 40b. The internal cavity 52 is dimensioned to capture the wire connector 22 of the second end portion 20b of the cable 20 therein. Due to the slit 50 being only large enough to accommodate the passage of the ribbon cable 20 therethrough, the wire connector 22 of the second end portion 20b of the ribbon cable 20 is prevented from exiting the internal cavity 52 of the block portion 42 via the slit 50 of the block portion 42.

The arm 44 of the slider 40 has a first end 44a integrally connected to or monolithically formed with a top surface 43 of the block portion 42 (e.g., perpendicular or parallel to the top surface 43 of the block portion 42). The arm 44 of the slider 40 extends perpendicularly from the block portion 42 of the slider 40 (e.g., a longitudinal axis of the arm 44 extends perpendicularly to a longitudinal axis of block portion 42). In some embodiments, the arm 44 may extend at a variety of angles relative to the block portion 42. Upon installation of the slider 40 to the track 12, the arm 44 is disposed outside of the channel 14 of the track 12 and the block portion 42 is disposed within the channel 14 of the track 12. It is contemplated that the arm 44 may extend upwardly or downwardly relative to the track 12 or laterally from either side of the track 12.

The arm 44 of the slider 40 defines a bore 54 longitudinally therethrough dimensioned for receipt of the wire(s) 24 of the second end portion 20b of the cable 20. A second end 44b of the arm 44 defines an opening 56 in communication with the bore 54 to allow for the wire 24 of the second end portion 20b of the cable 20 to extend out of. The block portion 42 further defines an opening 58 therethrough that is in communication with both the internal cavity 52 of the block portion 42 and the bore 54 of the arm 44 such that the second end portion 20b of the cable 20 may extend from the internal cavity 52 of the block portion 42, into the bore 54 of the arm 44 via the opening 58 in the block portion 42, and out of the arm 44 via the opening 56 in the second end 44b of the arm 44. The block portion 42 may further include an access hole 60 that is aligned with both the opening 58 of the block portion 42 and the bore 54 of the arm 44 to assist in the manual passing of the wire(s) 24 of the second end portion 20b of the cable 20 through the opening 58 of the block portion 42 and through the bore 54 of the arm 44.

With reference to FIGS. 5-7B, the biasing assembly 70 of the cable routing system 10 is disposed within the channel 14 of the track 12 adjacent the second end portion 12b of the track 12. The biasing assembly 70 includes a biasing member 72 which may be an extension spring having a length selected based on a length of the track 12 such that the slider 40 will be permitted to slide the entire length of the track 12 without damaging the biasing member 72. In some embodiments, the biasing member 72 may be any suitable biasing member such as a constant-force spring, a flat spring, or the like. The biasing member 72 includes a first end portion 72a fixedly connected to the second end portion 12b of the track 12 and a second end portion 72b associated with the intermediate portion 20c of the cable 20. In other embodiments, the biasing member 72 may be configured similarly to a key ring retractor or the like. Specifically, the biasing may include a coiled spring having a tether extending from a free end thereof, and which tether spools onto or around the coiled spring when the coiled spring is in a retracted condition. In use, a free end of the tether would connect to a bridle or connector 74, as described below.

To associate or couple the second end portion 72b of the biasing member 72 with the intermediate portion 20c of the cable 20, the biasing assembly 70 of the cable routing system 10 further includes a bridle or connector 74 having an axle 76 such as a wheel, a rod, a spindle, a drum, or the like. The second end portion 72b of the biasing member 72 is associated with the intermediate portion 20c of the cable 20, via the connector 74 and the axle 76, and applies a constant tension on the intermediate portion 20c of the cable 20, which is designed to prevent buckling, crimping, bunching, or any other unwanted behavior of the cable 20 that may impede the smooth and uninterrupted movement of the slider 40 along the track 12.

The connector 74 may include a first end 74a coupled to the second end portion 72b of the biasing member 72, and a second end 74b. The second end 74b of the connector 74 may be a wire loop that defines a hole 78 therethrough. The second end 74b of the connector 74 extends through a rotation axis defined through the axle 76 such that the axle 76 is rotatably coupled to the second end 74b of the connector 74. In embodiments, it may desirable for the axle 76 to be non-rotatably connected to the second end 74b of the connector 74. As so connected, the axle 76 will slide across and against the cable 20 during operation.

To couple the intermediate portion 20c of the cable 20 to the axle 76, the intermediate portion 20c of the cable 20 is folded over the axle 76 and threaded through the hole 78 of the connector 74 to form a dynamically folded portion 28 in the intermediate portion 20c of the cable 20. When the cable 20 is folded in this manner, the second end portion 20b of the cable 20 and the intermediate portion 20c of the cable 20 are parallel with one another and spaced apart a distance equal to or substantially equal to a diameter of the axle 76. The folded portion 28 of the intermediate portion 20c of the cable 20 is considered "dynamic" because the folded portion 28 of the cable 20 shifts along the longitudinal axis "X" of the track 12 as the slider 40 moves along the track 12, as will be described in further detail below.

During movement or translation of the slider 40 along the track 12 (in either direction), the axle 76 supports movement of the intermediate portion 20c of the cable 20 along the circumference of the axle 76. In embodiments, the axle 76 may rotate as the intermediate portion 20c of the cable 20 is conveyed about the circumference of the axle 76, or alternatively, as briefly described above, the axle 76 may remain rotatably fixed and allow the intermediate portion 20c of the cable 20 to slide along and relative to the outer surface of the axle 76.

During assembly of the cable routing system 10, the first end portion 20a (FIG. 1) of the cable 20 is fixed to the first end portion 12a of the track 12 via a fastener (e.g., a screw), an adhesive, or the like. The first end portion 12a of the cable is positioned to extend within a lower portion 14a (FIG. 4) of the channel 14 of the track 12. The second end portion 20b of the cable 20 is threaded through hole 78 of the connector 74 and folded over the axle 76 to form the dynamically folded portion 28 of the intermediate portion 20c of the cable 20. In embodiments, alternatively, the first end portion 20a of the cable 20 may be threaded through the hole 78 of the connector 74.

The second end portion 20b of the cable 20 is positioned into the cavity 52 of the block portion 42 of the slider 40 via the slit 50 in the trailing end 40b of the block portion 42. The wire connector 22 of the second end portion 20b of the cable 20 is secured in the cavity 52 of the block portion 42 with an interference fit. The wire 24 of the second end portion 20b of the cable 20 is passed through the opening 58 of the block portion 42 of the slider 40, into the bore 54 of the arm 44 of the slider 40, and out of the arm 44 via the opening 56 in the end 44b of the arm 44. It is contemplated that the second end portion 20b of the cable 20 may be secured to the slider 40 before or after the first end portion 20a of the cable 20 is secured to the first end portion 12a of the track 12.

The slider 40 is coupled to the track 12 by aligning the linear slots 46a, 46b defined along the slider 40 with the rails 16a, 16b of the track 12, and sliding the slider 40 onto the rails 16a, 16b of the track 12 with the leading end 40a of the slider 40 oriented toward the first end portion 12a of the track 12. With the slider 40 coupled to the track 12, the block portion 42 of the slider 40, along with the intermediate portion 20c of the cable 20, are disposed within the channel 14 of the track 12, and the arm 44, along with the wire 24 of the second end portion 20b of the cable 20, are disposed outside of the channel 14 of the track 12. Due to the intermediate portion 20c of the cable 20 being folded over the axle 76, the second end portion 20b of the cable 20 extends through the upper portion 14a of the channel 14 of the track 12, and the first end portion 20a of the cable 20 extends through the lower portion 14b of the channel 14 of the track 12 such that the first and second end portions 20a, 20b of the cable 20 are parallel and laterally spaced from one another. The first end portion 72a of the biasing member 72 is fixed to the second end portion 12b of the track 12 via an adhesive, a fastener (e.g., a screw), or the like. In this way, the dynamically folded portion 28 of the intermediate portion 20c of the cable 20 is coupled to the second end portion 12b of the track 12 via the biasing assembly 70.

Figure 7A:
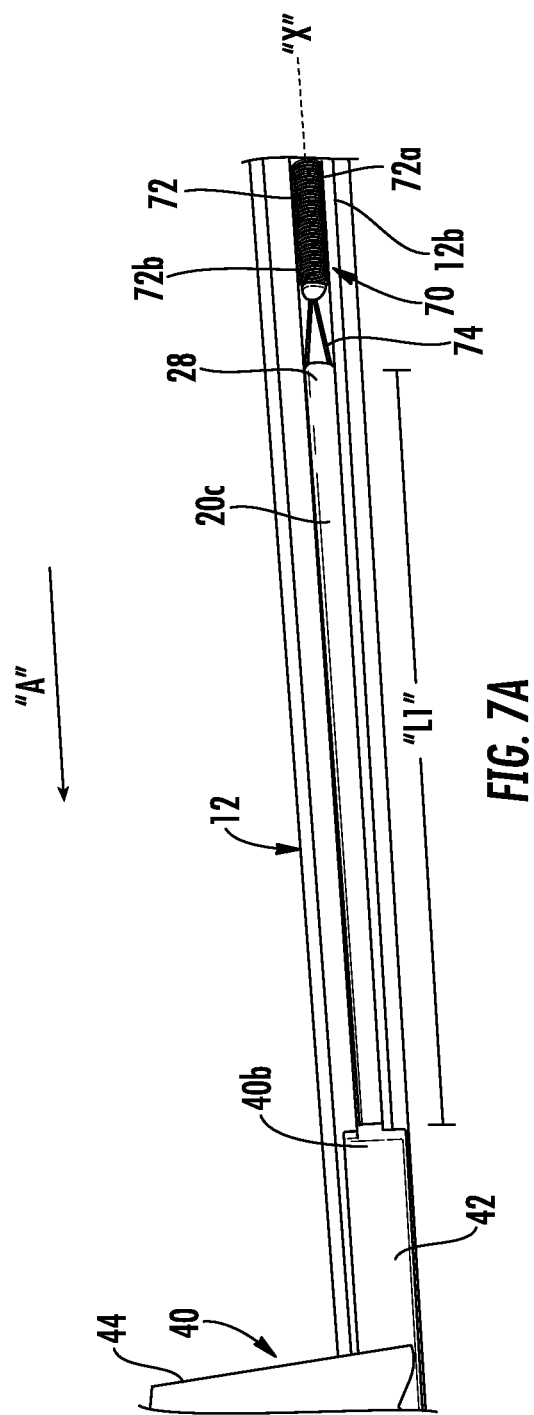
FIG. 7A is a top view of the cable routing system of FIG. 1, illustrating the slider in a first position on the track.
Figure 7B:
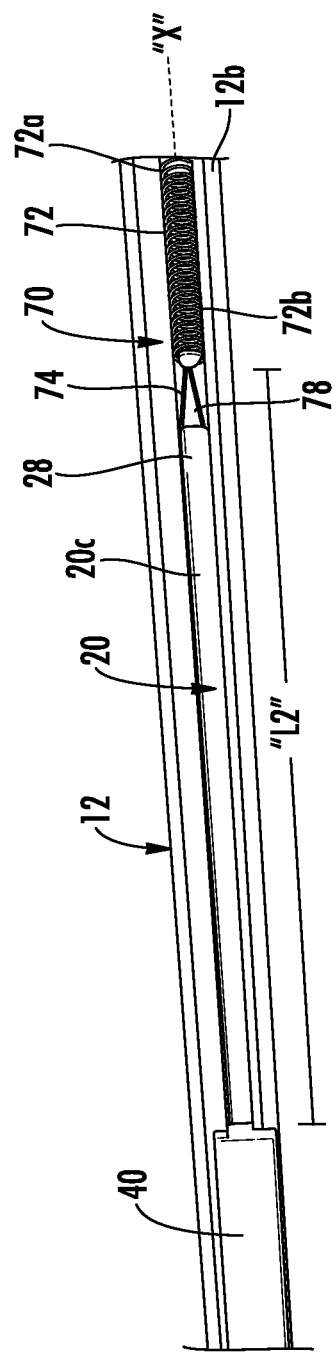
FIG. 7B is a top view of the cable routing system of FIG. 1, illustrating the slider in a second position on the track.

With reference to FIGS. 7A and 7B, upon sliding the slider 40 along the track 12 in a direction away "A" from the second end portion 12b of the track 12, the slider 40 pulls the second end portion 20b of the cable 20 towards the first end portion 12a of the track 12, thereby drawing the intermediate portion 20c of the cable 20 over the axle 76. The intermediate portion 20c of the cable 20 that extends through the upper portion 14a (FIG. 4) of the channel 14 of the track 12 has a first length "L1" (FIG. 7A) prior to moving the slider 40, and a second length "L2" (FIG. 7B) greater than first length "L1" after the slider 40 is moved towards the first end portion 12a of the track 12. This is a result of the intermediate portion 20c of the cable 20 passing over the axle 76 during movement of the slider 40.

As the slider 40 and the second end portion 20b of the cable 20, along with the axle 76 and the connector 74, move away from the second end portion 12b of the track 12 and towards the first end portion 12a of the track 12, the biasing member 72 is stretched while maintaining tension on the intermediate portion 20c of the cable 20. This constant tension created in the intermediate portion 20c of the cable 20 by the biasing member 72 keeps the intermediate portion 20c of the cable 20 taught, thereby preventing crimping, folding, buckling, or bunching of the cable 20 during the slider's 40 traversal of the track 12.

Figure 8:
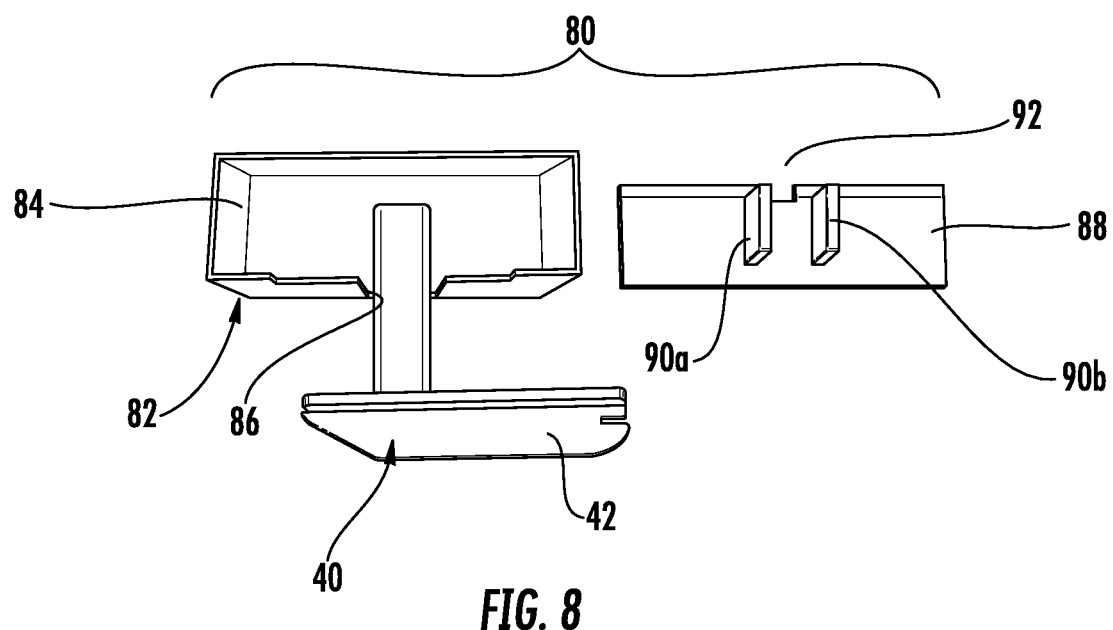
FIG. 8 is a top view of the slider and a slider coupler of the cable routing system of FIG. 1.

In one embodiment, as shown in FIG. 8, the cable routing system 10 may include a slider coupler 80 configured to couple the arm 44 of the slider 40 to a track such as a track used to support a sliding door carrying a pane of electrified glass. In some embodiments, the coupler 80 may couple the arm 44 of the slider 40 to a fixed surface. The coupler 80 includes a main body 82 defining a cavity 84, and an opening 86 in communication with the cavity 84. The opening 86 is dimensioned for the receipt of the arm 44 of the slider 40. The coupler 80 further includes a cover plate 88 dimensioned to cover the cavity 84 of the main body 82 and to be friction fitted into the cavity 84. The cover plate 88 has a pair of spaced apart flanges 90a, 90b for capturing the arm 44 of the slider 40 therebetween. The cover plate 88 further defines an opening 92 dimensioned for the passage of the wire(s) 24 (FIG. 1) of the second end portion 20b of the cable 20.

The cable routing system 10 may be used to provide electricity to an energy receiving device such as a pane or piece of electrified glass (e.g., associated with a window or a door). The cable routing system 10 provides continuous power to the electrified glass even when the electrified glass is moving or sliding relative to the power source.

Figure 9:
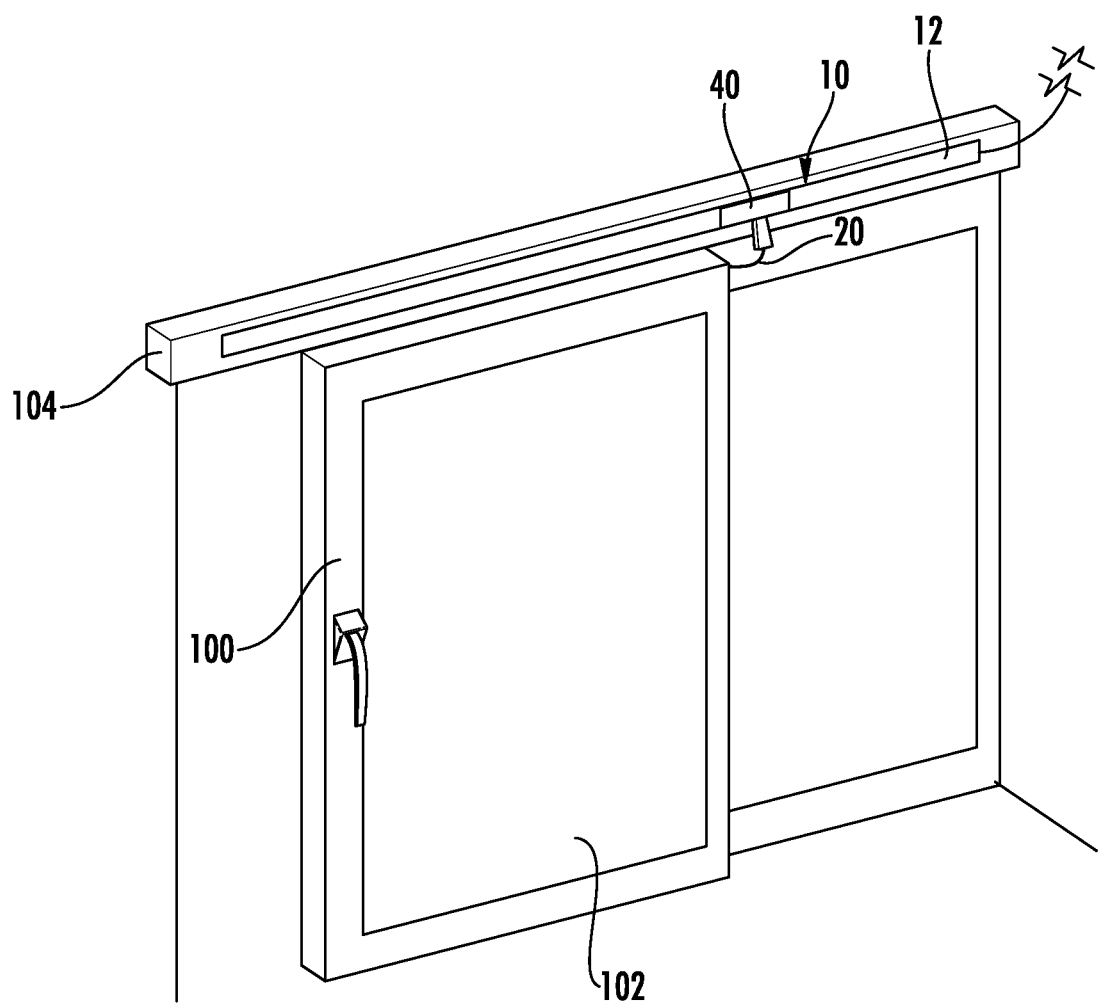
FIG. 9 is a perspective view of the cable routing system of FIG. 1, installed in a sliding door system for providing electricity to a pane of electrified glass.

For example, as shown in FIG. 9, the cable routing system 10 may be installed for use with a sliding panel 100 (e.g., a door, a window, or vertically in a single or double hung window) that is outfitted with a pane of electrified glass 102. To install the cable routing system 10, the track 12 is fixed to a support structure 104 (e.g., a ceiling, a wall, a sliding door track). In some installations, the track 12 may be fixed to the sliding panel 100 rather than a fixed surface, whereas the slider 40 may be fixed to the fixed surface such that the track 12 moves relative to the slider 40. The first end portion 20a (FIG. 1) of the cable 20 has a wire or wires that extend out of the first end portion 12a of the track 12. The wire(s) of the first end portion 20a of the cable 20 are connected to a power source such as a wall outlet or electrical box (not shown). The wire(s) 24 of the second end portion 20b of the cable 20 that extends out of the opening 56 of the arm 44 of the slider 40 is electrically connected to the electrified glass 102 to transfer power from the power source to the electrified glass 102. As the sliding door 100 moves the electrified glass 102, the slider 40 correspondingly moves along the track 12 to provide continued power to the electrified glass 102 irrespective of the position of the sliding door 102 on its track 104.

It is contemplated that the above-described cable routing system 10 may be used with various types of electrified glass including, but not limited to, smart glass, switchable privacy glass, heated glass, SPD smart glass, electrostatic glass, electrochromic glass, or any other glass that requires some form of electric current to operate or change state. In further embodiments, the cable routing system 10 may be used with any other energy receiving device or electrical device such as a keypad, a touch switch, a touch plate, an electrical lock, a motion detector, lights, speakers, clocks, display units, video screens, electrical outlets, or any other universally adaptable electrical connector or receptacle. It is further contemplated that the cable routing system 10 may be used with energy receiving devices that are powered by fluid, air, gas, pneumatics, fiber optics, etc.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

The invention claimed is:

1. A self-contained cable routing system for powering an energy receiving device associated with a movable member, comprising:
    a track defining a channel therethrough;
    a slider configured to be at least partially disposed within the channel of the track and slidably coupled to the track;
    a cable configured to extend through the channel of the track and including:
        a first end portion configured to be fixed adjacent a first end portion of the track and to be electrically coupled to a power source; and
        a second end portion configured to be fixed to the slider; and
    a biasing assembly including a biasing member coupling the cable to the track such that the biasing member maintains a tension on the cable as the slider moves along the track with the second end portion of the cable.

2. The self-contained cable routing system according to claim 1, wherein the biasing member has a first end portion fixed relative to the track and a second end portion configured to be associated with the cable.

3. The self-contained cable routing system according to claim 2, wherein the cable includes an intermediate portion interconnecting the first and second end portions of the cable, the second end portion of the cable being folded over the intermediate portion of the cable.

4. The self-contained cable routing system according to claim 3, wherein the intermediate portion of the cable has a dynamically folded portion, the second end portion of the biasing member being associated with the dynamically folded portion of the intermediate portion of the cable.

5. The self-contained cable routing system according to claim 4, wherein the biasing assembly further comprises an axle coupled to the second end portion of the biasing member, wherein the dynamically folded portion of the intermediate portion of the cable is wrapped about the axle, the axle configured to support a movement of the cable along a circumference of the axle as the slider moves along the track.

6. The self-contained cable routing system according to claim 5, wherein the biasing assembly further comprises a connector having a first end coupled to the second end portion of the biasing member and a second end looped through both the axle and the dynamically folded portion of the intermediate portion of the cable to couple the cable to the biasing member.

7. The self-contained cable routing system according to claim 6, wherein a length of the cable extending through an upper portion of the track increases as the slider moves away from the biasing member.

8. The self-contained cable routing system according to claim 2, wherein the second end portion of the biasing member is configured to extend relative to the first end portion thereof in response to a movement of the slider away from the biasing member.

9. The self-contained cable routing system according to claim 2, wherein the first end portion of the biasing member is fixed to the second end portion of the track.

10. A self-contained cable routing system for powering an energy receiving device associated with a movable member, comprising:
    a track defining a channel therethrough;
    a slider configured to be at least partially disposed within the channel of the track and slidably coupled to the track, wherein the slider includes:
        a block portion disposed within the channel of the track; and
        an arm attached to the block portion and disposed outside of the channel of the track; and
    a cable configured to extend through the channel of the track and including:
        a first end portion configured to be fixed adjacent a first end portion of the track and to be electrically coupled to a power source; and
        a second end portion configured to be fixed to the slider.

11. The self-contained cable routing system according to claim 10, wherein the block portion defines a cavity for receipt of the second end portion of the cable, and the arm defines a bore therethrough in communication with the cavity such that the send end portion of the cable extends from the cavity of the block portion through the bore of the arm.

12. The self-contained cable routing system according to claim 11, wherein the cable is a ribbon cable and the second end portion of the ribbon cable includes:
    a wire connector captured in the cavity of the block portion of the slider; and
    at least one wire coupled to the wire connector, the at least one wire extending through the bore of the arm of the slider and projecting out of an opening defined in the arm of the slider.

13. A cable routing system for powering electrified glass associated with a slidable member, comprising:
    a track defining a channel therethrough;
    a slider including:

a block portion at least partially disposed within the channel of the track and slidably coupled to the track; and an arm attached to the block portion and disposed outside of the channel of the track;

a ribbon cable extending through the channel of the track and including:

a first end portion fixed to a first end portion of the track and configured to be electrically connected to a power source;

a second end portion fixed to the slider and extending from a cavity defined in the block portion through a bore defined through the arm and out of an opening defined in the arm; and a dynamically folded intermediate portion; and a biasing assembly including a biasing member having a first end portion fixed to a second end portion of the track and a second end portion associated with the dynamically folded intermediate portion of the cable such that the biasing member maintains a tension on the cable as the slider moves along the track with the second end portion of the cable.

* * * * *